United States Patent

Homes

[15] 3,642,017
[45] Feb. 15, 1972

[54] SHOCK WAVE SENSOR

[72] Inventor: Allen B. Homes, Rockville, Md.

[73] Assignee: The United States of America as represented by the Secretary of the Army

[22] Filed: July 23, 1970

[21] Appl. No.: 64,051

Related U.S. Application Data

[63] Continuation of Ser. No. 751,452,, Aug. 9, 1968.

[52] U.S. Cl..................................137/81.5, 73/388, 73/389, 235/201
[51] Int. Cl. .........................................F15c 1/12
[58] Field of Search..........................137/81.5; 73/180, 388 R

[56] References Cited

UNITED STATES PATENTS

| | | | |
|---|---|---|---|
| 3,390,611 | 7/1968 | Warren | 137/81.5 X |
| 3,452,707 | 7/1969 | Warren | 137/81.5 |
| 3,327,529 | 6/1967 | Bowles et al. | 137/81.5 X |
| 3,380,655 | 4/1968 | Swartz | 137/81.5 |
| 3,407,828 | 10/1968 | Jones | 137/81.5 |
| 3,420,255 | 1/1969 | Wilkerson | 137/81.5 |
| 3,447,554 | 6/1969 | Josephson | 137/81.5 |

*Primary Examiner*—Samuel Scott
*Attorney*—Harry M. Saragovitz, Edward J. Kelly, Herbert Berl and J. D. Edgerton

[57] ABSTRACT

As the shock wave in a diffuser passes over a pressure sensing orifice it causes a self-biased fluid amplifier to change state. The position of the shock wave within the diffuser may be determined by detecting the outputs of a plurality of the self-biased fluid amplifiers and a logic circuit is used to translate this information into a signal which will operate a servomechanism causing a bypass valve in the diffuser to open or close to reposition the shock wave into the desired position.

9 Claims, 4 Drawing Figures

INVENTOR
ALLEN B. HOLMES 3,642,017

SHOCK WAVE SENSOR

This application is a continuation of application, Ser. No. 751,452, filed Aug. 9, 1968.

RIGHTS OF GOVERNMENT

This invention described herein may be manufactured, used, and licensed by or for the United States Government for governmental purposes without the payment to me of any royalty thereon.

BACKGROUND OF THE INVENTION

In jet aircraft the diffuser performs the important function of maximizing the efficiency of the engine's use of incoming air. Basically, it converts high-velocity low-pressure air into the low-velocity high-pressure air which is required by the engine. It can readily be seen therefore that the efficiency of the jet engine, reflected in its fuel consumption, will be a direct function of the proper operation of its diffuser. The already critical function performed by the diffuser in subsonic aircraft has become more critical and more complicated with the advent of the newer supersonic aircraft which requires efficient operation at subsonic and supersonic velocities. The above-mentioned velocity to pressure conversion process is performed by constructing the diffuser in the form of a convergent-divergent nozzle. Air entering the diffuser is decelerated from supersonic to subsonic velocities thereby, in effect, converting velocity to pressure.

The efficiency of a diffuser is a direct function of the amount of pressure recovered in the diffusion process; that is, efficient diffusion requires maximum pressure recovery. The major impediment to maximum pressure recovery is the presence of a series of oblique shock waves and a final normal shock wave in a diffuser. The pressure losses across these shock waves, primarily the loss across the normal shock wave, render the diffusion process a nonisentropic one. The amount of loss, however, can be controlled and minimized by controlling the Mach number or position in a diffuser at which the normal shock wave occurs. The ideal condition, of course, being a Mach number of 1 at which the losses would be zero. This latter condition is generally known as critical operation and occurs at or near the throat of the diffuser.

The extremes of inefficient diffuser operation occur at subcritical and supercritical operation. At subcritical operation, the normal shock has been expelled form and occurs at the intake of the diffuser. In this mode pressure recovery is at a minimum because the airflow has not been decelerated; the Mach number being well above 1. Further, there are safety problems arising from the shock wave occuring at this point. Because of the severe reduction in efficiency of the diffuser, it is likely that the engine will cease to function. Subcritical operation of the diffuser will also result in severe buffeting of the engine pod and with the normal shock wave at the diffuser intake will produce a large amount of noise. Supercritical operation occurs when the normal shock wave is allowed to move too far downstream of the throat into the divergent end of the diffuser. The diverging walls will permit the air to reaccelerate thus reducing pressure recovery across the normal shock wave.

It can therefore be seen that in order to insure efficient diffuser operations and thereby ensure efficient engine operation it is desirable to maintain the position of the normal shock wave as close to critical operation as possible. The difficulty of accomplishing this is, however, significantly increased by the fact that near-critical operation is a highly unstable condition and by the fact that this condition must be maintained in a wide variety of operating environments. Devices previously used to sense shock and to utilize the sensed signal for the purpose of controlling the position of the shock wave have primarily consisted of mechanical transducers for sensing the shock wave and electronic circuits for utilizing the sensed signal for control purposes. Such devices have been relatively complicated and have offered significant reliability problems. In addition the electronic control circuits previously used have required considerable space and have added significantly to the weight of the aircraft in which they were operated.

It is therefore an object of this invention to provide a means for sensing the position of a shock wave which is reliable, relatively uncomplicated, light in weight, and requires little space.

It is another object of this invention to provide a means for sensing position of a shock wave accurately and for utilizing this sensed information to reposition the shock wave so as to provide for efficient operation in a diffuser.

A further object of this invention is to provide a means having no moving parts for sensing the position of a shock wave and for sensing position of a shock wave accurately and for utilizing this sensed information to reposition the shock wave so as to provide for efficient operation in a diffuser.

A further object of this invention is to provide a means having no moving parts for sensing the position of a shock wave and for converting the sensed signal to an electrical signal indicative of the position.

Still another object of this invention is to provide a means for sensing the position of a shock wave more accurately than has been possible with previously used systems.

An additional object of this invention is to provide a control system for maintaining a stable near critical shock location in a diffuser in order to ensure safe and efficient flight performance over a wide range of conditions including the transition from subsonic to supersonic flight velocities.

SUMMARY OF THE INVENTION

These and other objects may be obtained by using as a means for sensing the position of a shock wave a series of self-biased fluid amplifiers; the states of which will indicate the shock wave location. That is, the position of the shock wave is determined by the number of consecutive sensing elements in a given state. A fluidic logic system utilizes this information to produce a signal which will indicate the position of a normal shock wave. This signal may be used to operate a servomechanism which will position a bypass valve which will reposition the shock wave as necessary. In order for the entire system to operate properly over a wide variety of conditions flueric regulation is used.

BRIEF DESCRIPTION OF THE DRAWING

The specific nature of the invention as well as other objects, aspects, uses, and advantages thereof will clearly appear from the following description and from the accompanying drawings, in which.

DESCRIPTION OF THE PREFERRED EMBODIMENT

Figure 1A:
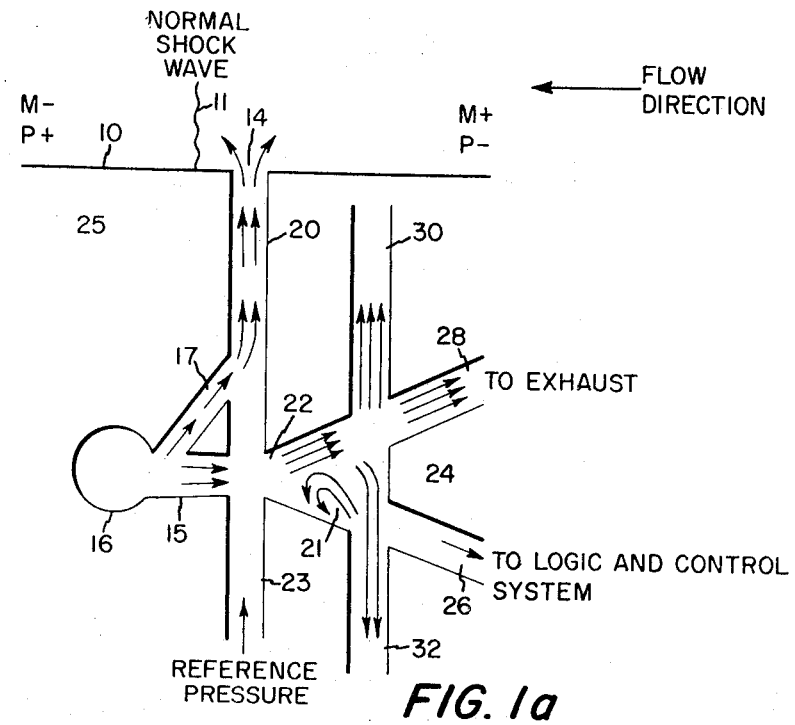
FIGS. 1a and 1b are a schematic view of an individual sensing element of my invention illustrating the two modes of operation of the element.
Figure 1B:
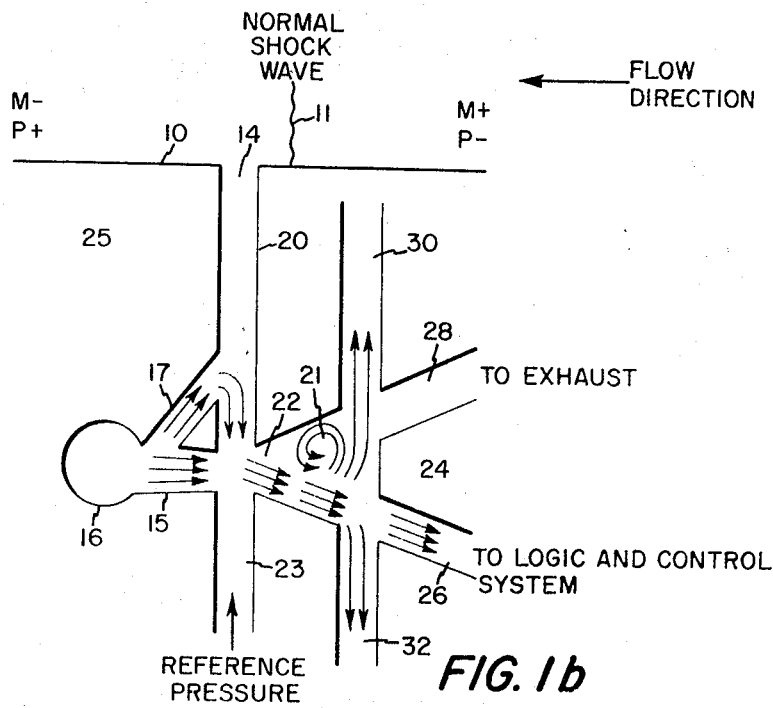

FIGS. 1a and 1b show the sensing element used in my invention for determining the position of the normal shock wave along a planar surface. FIG. 1a illustrates the operation of the sensing element for a first position of the normal shock wave, and, in this figure, for a flow direction of from right to left the shock wave 11 is shown to be positioned on planar surface 10 to the left of an orifice 14. As indicated in the drawing, for the indicated flow direction the pressure to the left of the normal shock wave exceeds the pressure in the right of the shock wave with the velocity to the right of the shock wave being greater than that on the left of the shock wave.

A basic element used for sensing the position of the shock wave is the self-biased fluid amplifier. This amplifier is fully and completely described in U.S. Pat. application Ser. No. 588,677 by Elmer L. Swartz, filed Oct. 19, 1960 and now U.S. Pat. No. 3,442,279 issued May 6, 1969. A brief description of the self-biased amplifier in the context of my invention follows. In fluid amplifier 25 a fluid power source 16 delivers a power stream to an interaction chamber 22 through an inlet channel 15. Output channels 26 and 28, respectively, communicate with interaction chamber 22. Relatively low-power fluid signals may be supplied through either control channel 20 or control channel 23 to interaction chamber 22. Relatively low-power fluid signals may be supplied through either control channel 20 or control channel 23 to interaction chamber 22 at generally right angles to the path of the power stream emanating from inlet channel 15. Control channels 20 and 23, respectively, act to selectively deliver control signals to interaction chamber 22 in order to deflect the power stream into one of the output channels 26 or 28. A bias channel 17 is provided which has one end connected slightly downstream of power source 16 and the other end connected to control channel 20 slightly upstream of interaction chamber 22; control channel 17 acts to divert a portion of the power stream into control channel 20. Because the shock wave 11 is positioned to the left of orifice 14 which communicates with control channel 20, a relatively low pressure will exist in control channel 20. For this reason the portion of the power stream which is passing through channel 17 moves into control channel 20 in a direction away from interaction chamber 22. When a power stream is caused to issue from power source 16 the flow through bias channel 17 and the main power stream create a low-pressure area within the section of control channel 20 between the interaction chamber 22 and the point at which bias channel 17 intercepts control channel 20. This reduced pressure area acts to entrain the power stream in output channel 28. A portion of the fluid proceeding out output channel 28 will impinge upon blunt splitter 24 causing a vortex 21 to form. Vortex 21 serves to enhance the entrainment of fluid flow into and through output channel 28. Bleed channels 30 and 32 are provided to exhaust excess fluid.

If, as is demonstrated in FIG. 1a, the normal shock wave 11 moves to the right past orifice 14, control channel 20 will be subjected to a significantly higher pressure. This pressure will tend to divert the bias flow in bias channel 17 from a direction out of control channel 20 and move it through the control channel in the direction of interaction chamber 22. The result of coupling the additional pressure into control channel 20 will be that the power stream will be deflected from output channel 28 into output channel 26 which in turn is coupled to the logic and control system which will be described hereinbelow. It must be noted, however, that in order for self biased amplifier 25 to operate in the above-described manner the pressure sensed at orifice 14 by control channel 20 must exceed a reference pressure coupled to control channel 23. The source of this reference pressure will be discussed in conjunction with FIG. 2 below. If the pressure seen by orifice 14 should return to the magnitude discussed in conjunction with FIG. 1a the amplifier will automatically revert to the operational mode discussed in conjunction with that figure. That is, a reduction of the pressure in control channel 20 will allow flow from bias channel 17 to proceed out control channel 20 as before thereby entraining the power stream in output channel 28.

Figure 2:
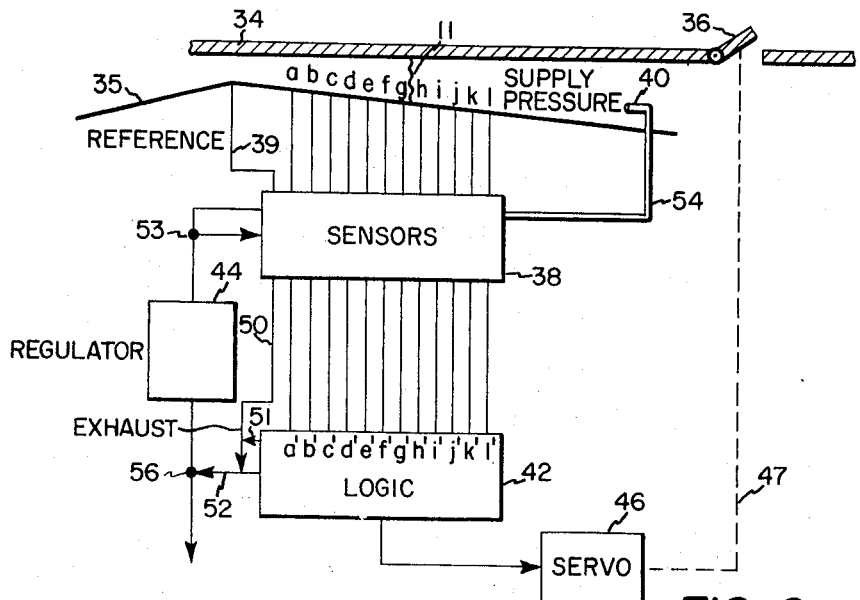
FIG. 2 is a schematic view of the entire system of my invention for sensing and controlling the position of a normal shock wave in a diffuser.

FIG. 2 is a block diagram of a system of my invention using the above-described sensing elements for the purpose of accurately positioning the shock wave within the diffuser. A cross section of the upper half of a diffuser is shown in the drawing with element 34 representing the cowling and element 35 representing the center body. A plurality of the sensing elements described in FIGS. 1a and 1b are represented by the block labeled sensors and numbered 38. Sensors 38 each have their control channels 20 (see FIG. 1) opening into the diffuser through orifices 14 (see FIG. 1). For purposes of discussion the points at which these control channels open into the diffuser have been labeled with the letters a through 1 in this figure. A supply pressure for power sources 16 (see FIG. 1) is obtained from the air flowing through the diffuser by means of an input port 40. It will be noticed that channel 54 which connects input port 40 with power sources 16 proceeds to a junction point 53 before being connected with the power sources for each amplifier. The purpose for this will be discussed hereinbelow. The reference pressure for each of the control channels 23 (see FIG. 1) is obtained from an input line 39 opening into the diffuser at its throat. Each of the output channels 28 (see FIG. 1) of the amplifiers comprising the group of sensors 38 are connected to an exhaust channel 50 which in turn is connected to another exhaust channel 52. Flow from output channels 26 (see FIG. 1) which are operative when the control channel of the amplifier is subjected to a high pressure are each individually connected to a logic circuit 42. The connecting lines are labeled $a'$ through $1'$ corresponding to the labeling for the input control channels of each amplifier. Based on the information received from sensors 38 logic circuit 42 generates an electrical signal which is coupled to servomechanism 46, and servomechanism 46 is mechanically linked to a bypass valve 36 by a mechanical linkage 47.

In order to maintain a constant pressure ratio between the inputs of the sensors 38 and the output of the logic circuit 42 under varying environmental conditions a flueric pressure regulator 44 is used. As can be seen from the figure, the input pressure from supply port 40 is directed to regulator 44 and the exhaust from sensors 38 and logic circuit 42 is directed to the output of regulator 44. In essence, therefore, sensors 38 and logic circuit 42 constitute a load connected across regulator 44. A full and complete description of this regulating means may be found in my copending U.S. Pat. application, Ser. No. 726,934 filed May 6, 1968. Basically, the regulator is a supersonic convergent-divergent nozzle and the operation of the regulator depends upon maintaining a supersonic flow in the expansion section of the nozzle, and the fixed geometry of the nozzle is used to establish a constant pressure ration between two points in a nozzle. The two points in this case will be junction points 53 and 56.

Figure 3:
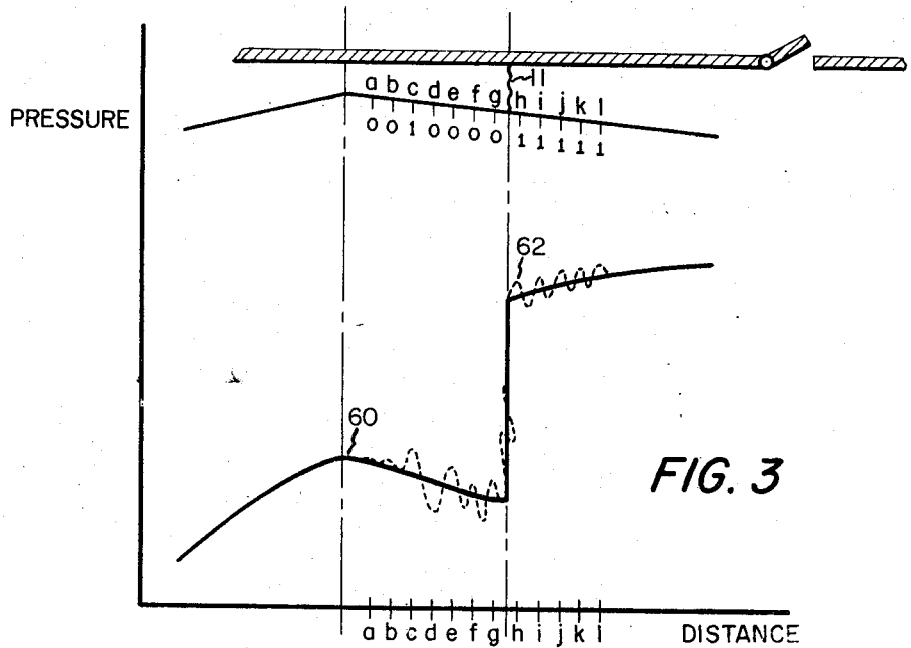
FIG. 3 is a curve illustrating the relationship between pressure and distance for airflow through a diffuser.

The operation of the system can best be understood by reference to FIG. 3 in conjunction with FIG. 2. In FIG. 3 a curve is shown illustrating the relationship between pressure in the diffuser and distance of flow through the diffuser. It will be noticed from the solid curve that, as the air flows into the diffuser towards the throat, pressure will increase, and after the airflow passes the throat into the divergent area of the diffuser, pressure will decrease because the velocity will again increase. When, however, flow reaches normal shock wave 11, there will be a sudden rapid rise in pressure followed by a more gradual pressure increase. It will be noticed that shock wave 11 occurs between the control inputs to the sensors labeled $g$ and $h$, and under ideal conditions, the fluid amplifiers $a$ through $g$ will be in a zero state or the fluid will be directed out output channel 28 (see FIG. 1). To the right of shock wave 11, because of the greatly increased pressure, amplifiers $h$ through 1 will be in a one state, or the fluid will be flowing out output channels 26 (see FIG. 1). If it is desired to locate the position of shock wave 11 in the diffuser, it would be a simple matter to scan the outputs of the sensors to determine where the transition from those sensors in the zero state to those sensors in the one state occurs.

In actual practice, however, this is not possible. It will be remembered that it was stated hereinabove that the solid curve represented ideal conditions. In fact in an operating diffuser there will be a number of random perturbations along the pressure curve. In the drawing these are represented by the dotted lines. If one of the random perturbations should exceed the reference pressure 60 prior to the actual shock wave transition, the amplifier located at that point would switch to its one state giving an erroneous indication of transition. In the drawing this condition has been indicated to occur for the amplifier situated at point $c$ in the diffuser. It is, therefore, necessary to provide some means for determining when an actual shock wave transition has occurred ignoring random transitions and for translating this location information into an electrical signal to operate servomechanism 46. This function is performed by logic circuit 42.

The function of logic circuit 42 is to provide an output when a specific combination of input signals satisfies the logic program. Because it has been determined experimentally that when three consecutive amplifiers have switched to their one state a shock wave transition has occurred, the logic program states that in order to have an output there must be three or more consecutive inputs. In the example given in FIG. 3 the logic circuit would ignore the one input from amplifier c and determine that the shock wave occurs between points g and h. This information is converted into a signal which operates servo-mechanism 46. The servomechanism will then mechanically operate a bypass valve 36 which will control the flow in the diffuser and reposition the shock wave as necessary.

It can be seen then that by simply adjusting the servomechanism the shock sensor system of my invention can be used to continuously monitor the position of the normal shock in a diffuser and to reposition the shock as necessary to provide for critical operation. By this means the system will maintain a stable near-critical shock location in order to ensure safe and efficient flight performance over a wide range of conditions.

It will be apparent that the embodiment of my invention shown is only exemplary and that various modifications can be made in construction and arrangement such as changing the number of sensor inputs in order to achieve greater precision and accuracy, using different types of fluid amplifiers or by using any logic circuit which will provide the desired information, within the scope of the invention as defined n the appended claims.

I claim:

1. An inlet control means for positioning the normal shock wave occurring in fluid flow in a diffuser, comprising:
   a. a series of orificies placed in the center body of said diffuser longitudinally along the flow path of said fluid,
   b. a plurality of self-biased fluid amplifiers for sensing a change of pressure in said fluid, each of said fluid amplifiers being caused to switch from one output channel to the other by a predetermined change in pressure, each of said fluid amplifiers having one control channel connected to one of said orifices, each of said fluid amplifiers having an other control channel connected to an orifice opening into the throat of said diffuser and each of said fluid amplifiers having their power streams obtained from the fluid flow in said diffuser;
   c. a fluidic logic circuit adapted to receive the output of said amplifiers when said amplifiers have been caused to change state by a pressure greater than the pressure existing at the throat of said diffuser and for generating an electrical signal from the input obtained from said outputs of said fluid amplifiers representing the position of said shock wave in said diffuser;
   d. a regulator means for maintaining a constant pressure ratio between the power input to said fluid amplifiers and exhaust from said fluid amplifiers and said logic circuit;
   e. means utilizing said electrical signal for opening or closing a bypass valve in said diffuser thereby positioning the shock wave.

2. Apparatus for determining the position of a normal shock wave in a high velocity fluid moving along a planar surface and for providing an output signal indicative of said position comprising:
   a. a plurality of orifices in said planar surface in a longitudinal relationship along the flow path of said fluid;
   b. a plurality of fluid amplifiers for sensing a change in pressure in said fluid, each of said fluid amplifiers having at least a pair of opposed control channels and a pair of output channels, one of said control channels being connected to a respective one of said orifices and the other of said control channels being connected to a reference pressure, each of said fluid amplifiers being adapted to switch from a first of said output channels to a second of said output channels when a pressure exceeding said reference pressure appears at the orifice associated there with; and
   c. a programmed fluidic logic circuit communicating with each of said second output channels for producing an output signal indicative of the position of said shock wave upon receipt of any predetermined combination of fluid signals through said second output channels.

3. The apparatus defined in claim 2 wherein said logic circuit is programmed to reject random pressure perturbations.

4. The apparatus defined in claim 2 wherein the reference pressure for each amplifier is received from a common source.

5. The apparatus defined in claim 2 comprising in addition a regulator means for maintaining a constant pressure ration between the fluid power inputs to said fluid amplifiers and the exhausts from said first output channels and said logic circuit.

6. The apparatus defined in claim 2 wherein said fluid amplifiers are self-biased fluid amplifiers each said self-biased amplifier having a bias channel connecting the power input and the control channel connected to said orifice.

7. The apparatus defined in claim 2 wherein said logic circuit is programmed to receive fluidic logic signals.

8. The apparatus defined in claim 7 wherein said logic circuit is programmed to produce an output whenever at least three consecutive amplifiers have switched their state.

9. The apparatus defined in claim 7 further comprising a servomechanism responsive to said logic circuit for mechanically operating a bypass valve.

* * * * *

PO-1050
(5/69)

UNITED STATES PATENT OFFICE
CERTIFICATE OF CORRECTION

Patent No. 3,642,017            Dated 15 February 1972

Inventor(s) Allen B. Holmes

It is certified that error appears in the above-identified patent and that said Letters Patent are hereby corrected as shown below:

Spelling of the inventor's last name from HOMES to HOLMES.

Signed and sealed this 20th day of June 1972.

(SEAL)
Attest:

EDWARD M. FLETCHER, JR.            ROBERT GOTTSCHALK
Attesting Officer                   Commissioner of Patents